Feb. 15, 1927. 1,617,570
P. A. BROCK
ENGRAVING MACHINE
Filed Jan. 16, 1925  5 Sheets-Sheet 4
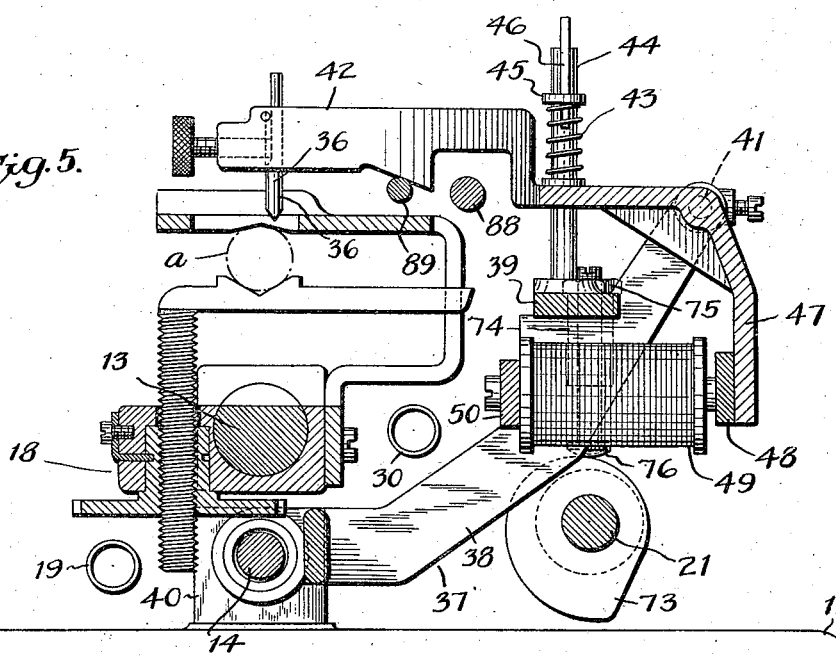
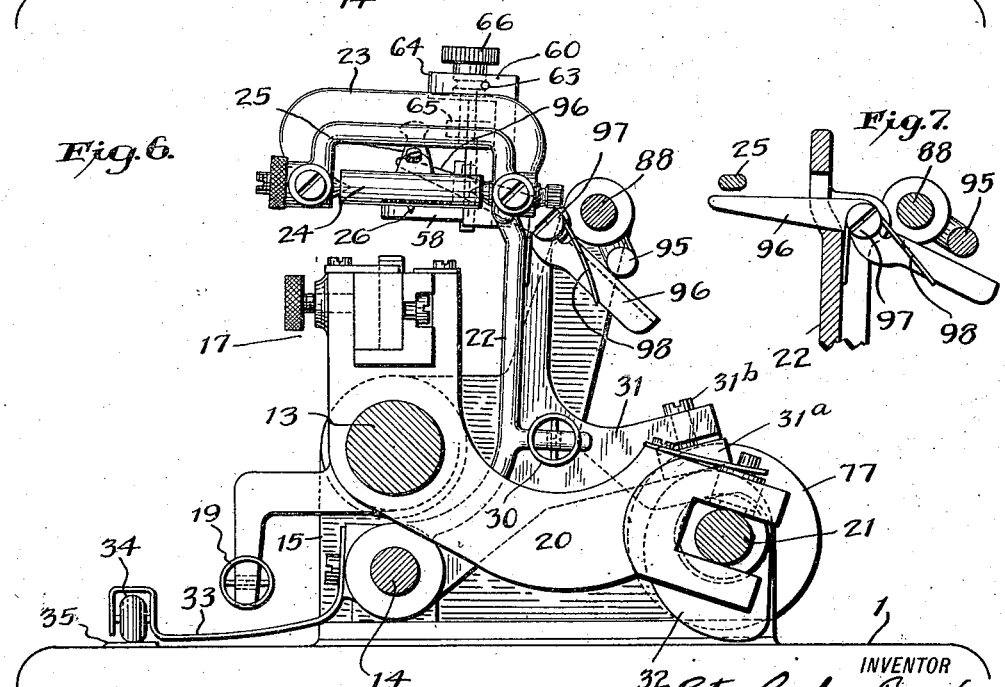
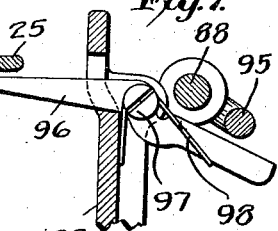

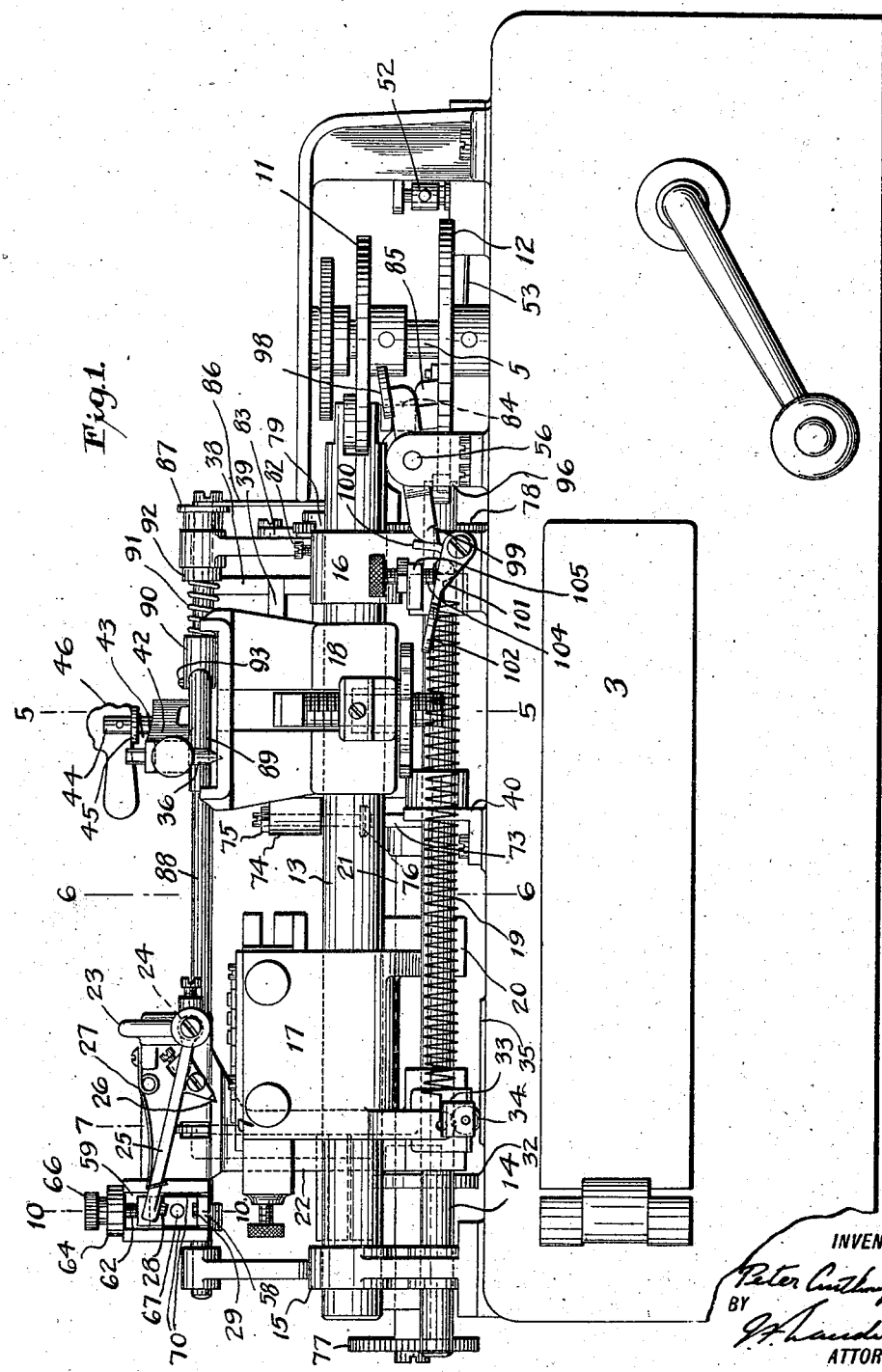

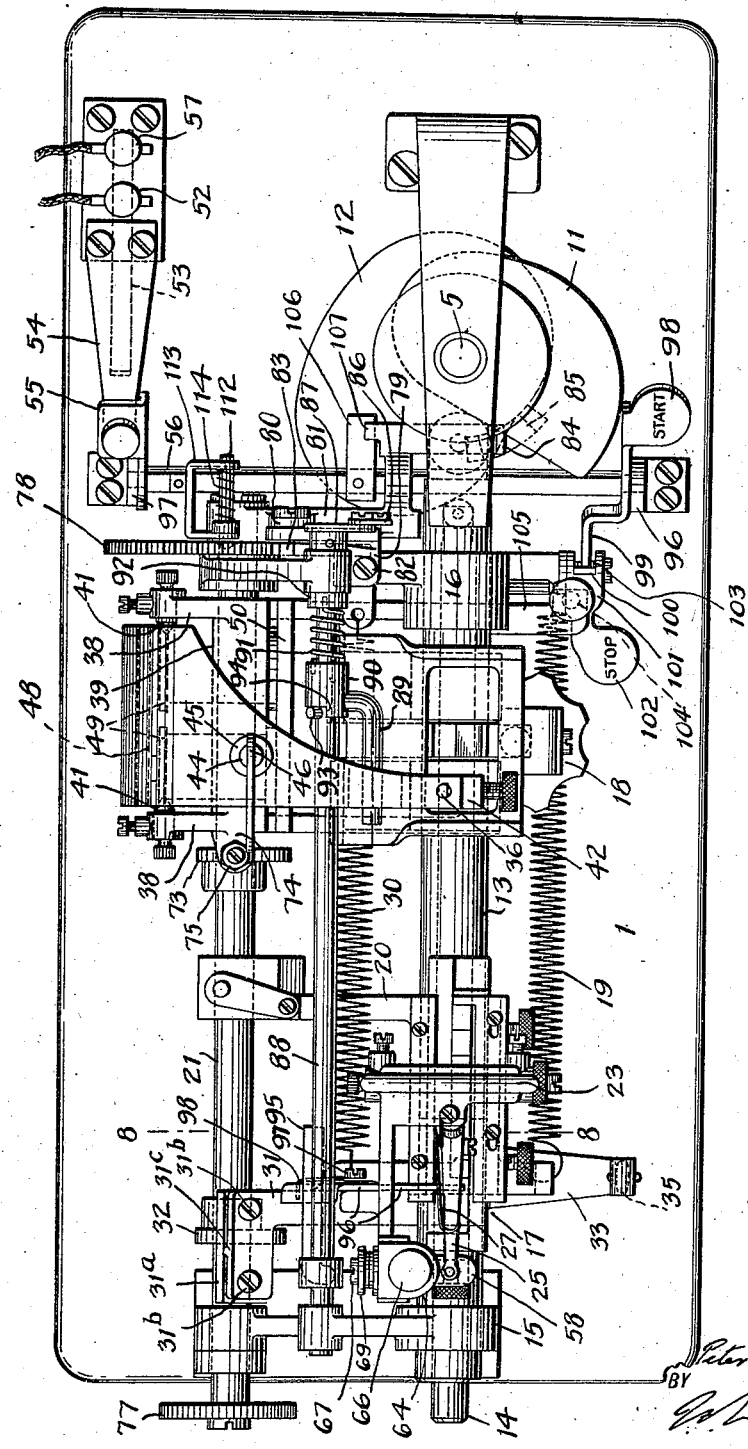

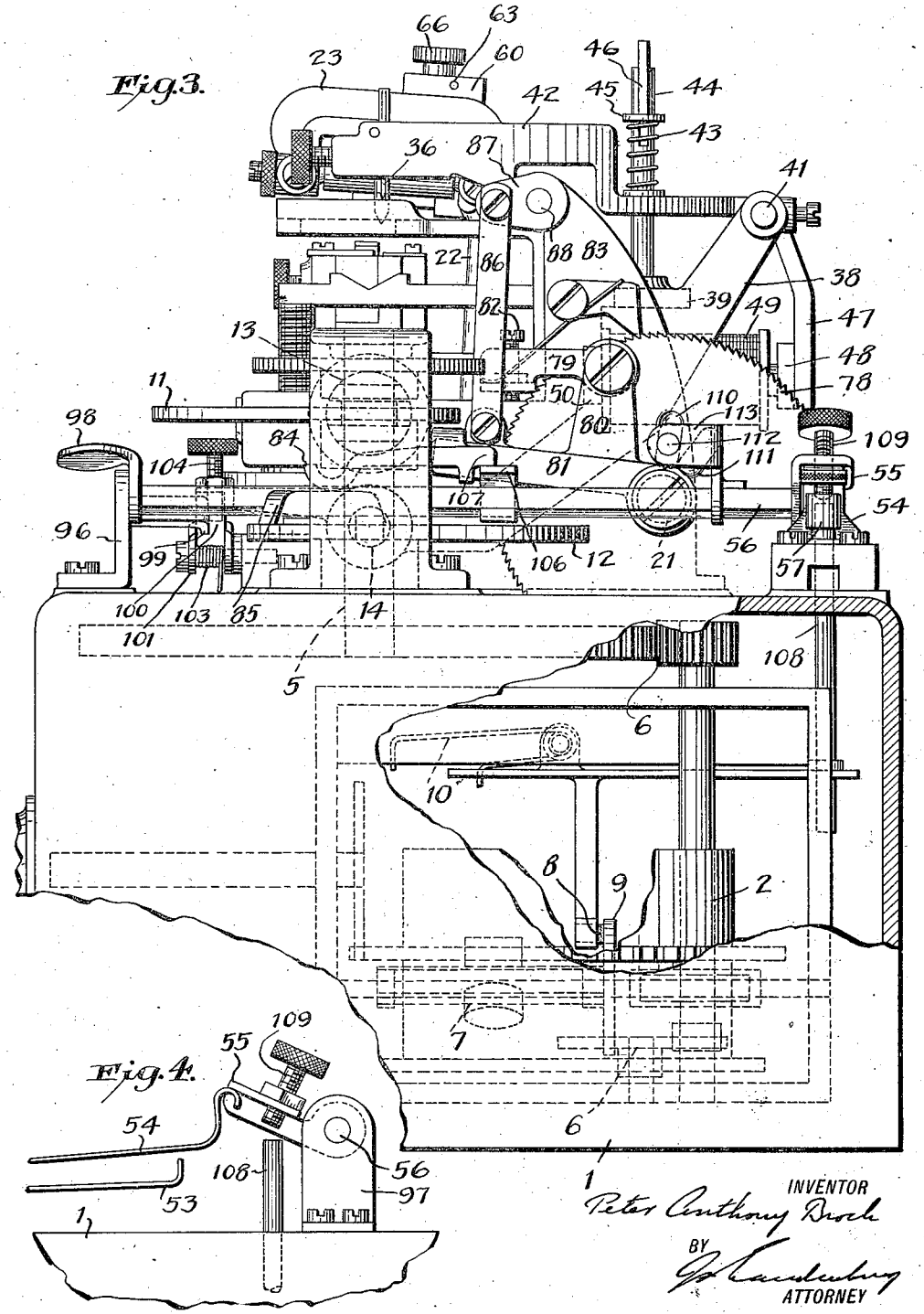

Feb. 15, 1927.
P. A. BROCK
1,617,570
ENGRAVING MACHINE
Filed Jan. 16, 1925    5 Sheets-Sheet 5
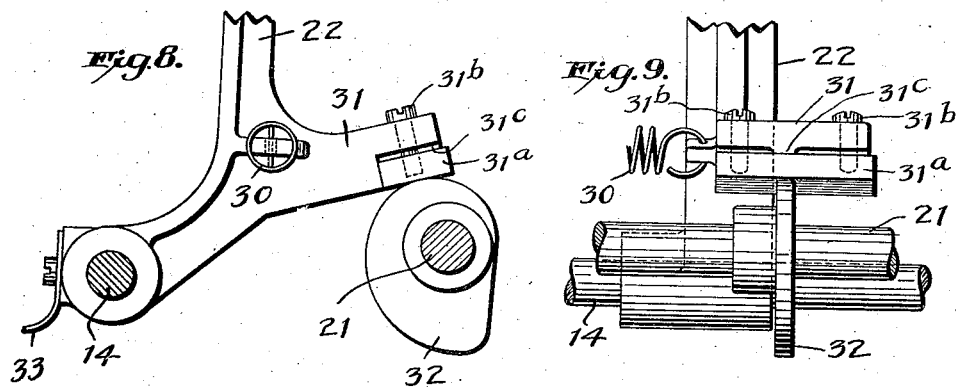
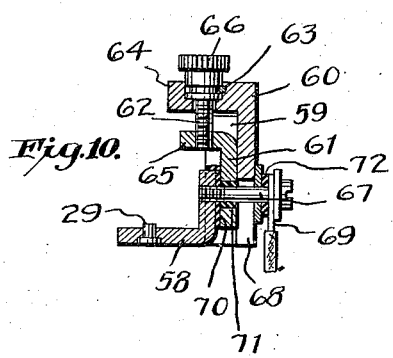
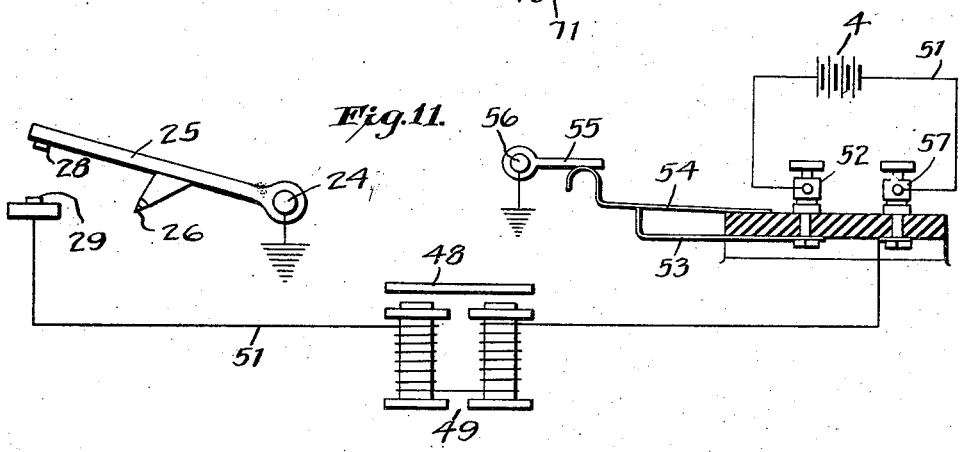

Patented Feb. 15, 1927.

1,617,570

UNITED STATES PATENT OFFICE.

PETER ANTHONY BROCK, OF JERSEY CITY, NEW JERSEY, ASSIGNOR TO THE ENGRAVO-GRAPH CORPORATION, A CORPORATION OF DELAWARE.

ENGRAVING MACHINE.

Application filed January 16, 1925. Serial No. 2,764.

The invention is an improvement in engraving machines in which there is relative synchronous reciprocation between a tracer and a pattern and between a tool and the work, and a step-by-step feed of the tracer and tool relatively to the pattern and work between working strokes, the oscillation of the tracer as it rides over the raised pattern being applied through electrical means having an electrical contact moved by the tracer arm, to control or effect the movement of the tool into and out of engagement with the work, the tracer and tool being in action during one direction of relative reciprocation only, and mechanical means being provided for lifting and supporting the tracer arm and the electrically controlled tool during the idle stroke of the machine. A machine of this type which the present machine more particularly resembles is disclosed in the application of Bruckner & McKeown, filed July 14, 1922, Serial No. 574,977.

In such a machine the tracer arm in its low position closes an electric circuit which energizes an electromagnet which holds the tool away from the work against the action of a spring and/or gravity; while, when the tracer is raised, as in passing over raised type face, the circuit is broken and the tool descends upon the work. It resulted from this that the action of the mechanical lifting and supporting means referred to was likely to permit the cutting tool to engage the work and make a false cut or nick at the end of the working stroke when the tracer was first lifted and before the tool was properly supported, and again at the end of the idle stroke when the tracer and the tool would be simultaneously lowered until the moment when the tracer arm closed the circuit, whereupon the tool would be electrically retracted but probably not before another false mark had been made. To overcome this difficulty the Bruckner & McKeown machine embodied an additional circuit closing means operated from the drive of the machine and timed to energize the magnet briefly at the two end periods of the strokes, so that the tool would be electrically supported at these times when the operation of the mechanical supporting means would otherwise be likely to cause it to fall.

An important object of this invention is to do away with this supplementary electrical means and the necessity for closely timing its operation, and to provide a wholly mechanical means which not only supports the tracer and the tool out of engagement with the pattern and the work during the idle stroke but also, in itself, specially supports the tool at the end periods of the strokes, while the tracer is first lifted breaking the circuit, and again when the tracer arm is being lowered and until it closes the circuit. This is accomplished by mechanical lifting, supporting and lowering means comprising two parts having successive or overlapping action in respect to the tracer and tool, in such wise that the tool is supported by one part at the end of the working stroke before the tracer is lifted at all by the other part, while at the end of the idle stroke, or during the beginning of the working stroke, the support is not withdrawn from the tool so that it can touch the work until after the tracer arm has been completely lowered and has closed the magnet circuit.

In the operation of these machines wherein the amplitude of the oscillatory movements of the tracer riding over the pattern which cause the electrically-controlled working movements of the engraving tool are very small and have to be executed with reference to a precise level, and wherein the stationary electrical contact is the stop which determines the low position of the tracer, it is necessary that the fixed contact be set with great accuracy and that it be possible to correct the slightest misplacement, distortion or wear in any of the parts about the tracer. In the Bruckner & McKeown patent this could only be done by screwing the fixed contact up or down in its supporting bracket, which had to be done with tools from beneath and was very difficult to do accurately. In the present machine the contact need not be disturbed; but the entire bracket is mounted so that it may be shifted in a vertical direction on the tracer carriage and locked. This permits of the use of a top adjustment screw acting on the bracket and having a readily accessible head for easy and delicate finger operation.

Another feature of the present improved machine has to do with means for regulating the direction of travel of the tracer in the horizontal plane so that its reciprocatory movements are precisely parallel with the longitudinal lines of the pattern. If the pattern is set perfectly true, that is to say not slightly skewed either one way or the other in the horizontal plane with reference to the direction of movement of the pattern-holder, it is necessary that the tracer also travel precisely parallel with the same longitudinal lines. If it should happen that the pattern should be very slightly skewed laterally, then the tracer should travel back and forth in lines slanting at a corresponding deviation from the true longitudinal direction. The relative angularities may be extremely small, but unless they are adjusted the reproduction of the pattern on the work will be faulty. In the Bruckner & McKeown machine it was found that even the exceedingly slight warping that might take place in castings would cause trouble of this kind. I have found a very simple way of correcting any initial error in this respect and for compensating for conditions that may arise in the use of the machine, which consists in simply providing an arm of the tracer carriage which rides back and forth on a feed cam with a separate shoe having means for tiltingly adjusting and setting it on the arm.

Still other features relate to a ready and accurate means for centering the tool; to a means enabling the machine to be quickly and certainly set by hand at any one of a plurality of starting points for work or inscriptions of different sizes; to a means for readily adjusting the operation of the machine to the best engraving speed through the action of the starting device; and to an improved operative connection for causing the mechanical lifting and circuit-breaking means to be actuated whenever the machine is stopped.

In the accompanying drawings forming a part hereof:

Fig. 1 is a front elevation of the machine at rest;

Fig. 2 is a plan view thereof;

Fig. 3 is an end elevation on a larger scale;

Fig. 4 is a detail rear elevation of control parts in the running condition of the machine;

Fig. 5 is a cross-section on the line 5—5 of Fig. 1, showing the tool mechanically supported above the work;

Fig. 6 is a transverse section on the line 6—6 of Fig. 1, showing the tracer mechanically supported above the pattern;

Fig. 7 is a sectional detail view, taken on the line 7—7 of Fig. 1, showing the relation of parts in the running condition, when the tracer is down and the lifter is at rest;

Fig. 8 is an enlarged sectional detail view taken on the line 8—8 of Fig. 2;

Fig. 9 is a rear elevation of Fig. 8;

Fig. 10 is an enlarged sectional view on the line 10—10 of Fig. 1; and

Fig. 11 is a wiring diagram.

The machine has a hollow oblong base 1, constituting an enclosure for a spring driving motor 2 and certain mechanism as well as a box for a type drawer 3; and it may also house the battery 4 of Fig. 11, or the source of electrical power may be of another character or differently located. The motor drives a main vertical spindle 5 through suitable gearing 6. A centrifugal speed governor 7, driven from the gearing, automatically regulates the speed at which the machine operates. The friction brake element 8 of this governor cooperates with the axially movable rotary disk 9, and is normally applied by a spring 10 to hold the mechanism at rest. When the brake element is released, it permits the motor to start, and by varying the extent of its withdrawal, in the manner hereinafter described, the machine can be set to run faster or slower, according to the results desired.

The spindle 5 carries two peripheral cams 11 and 12 above the base, and these cams act respectively upon two parallel horizontal slide shafts 13 and 14, one being above the other and both being guided in bearings in brackets 15 and 16 which rise from the top of the base. The shaft 13 carries longitudinally spaced thereon a pattern-holder 17 and a work-holder 18, which are consequently reciprocated in the same sense. These parts are moved in one direction by the appropriately shaped cam 11, to be returned in the opposite direction by a spring 19.

An arm 20 extended rearward from the lower part of the pattern-holder 17 and bifurcated at its extremity to embrace slidingly a feed cam shaft 21, journaled in rear lower portions of the brackets 15 and 16, serves to keep the slide shaft 13 and the pattern and work-holders from turning.

The slide shaft 14 carries a tracer carriage 22 formed as an arm extending rearward and upward from said shaft and provided at its top with an inverted U-shaped bracket 23 over the pattern-holder. In this bracket is pivoted a shaft 24 disposed at right angles to the direction of reciprocation and carrying a tracer arm 25 extending generally parallel with the direction of reciprocation. Fixed on the tracer arm is a tracer 26, which is inclined downwardly away from the pivot shaft. The tracer and tracer arm are urged downward by a spring 27, and on the outer end of the tracer arm is a movable electrical contact 28. This contact cooperates with a stationary contact 29, which is positioned so that the contacts are closed upon each other when the tracer is down and are separated when the tracer is oscillated upward as the result of engagement with the raised portion of the pattern or type over which it travels.

The tracer rides over the type in one direction only of the relative reciprocation, and is held elevated clear of the pattern, in the manner which will be described, during the reverse or idle stroke. While the shaft 13 is being moved through its working stroke (to the left of Fig. 1) by the cam 11, the shaft 14 carrying the tracer carriage is simultaneously moved in the opposite direction by a spring 30, and at the end of the working stroke this shaft and the tracer carriage are returned by the cam 12.

The tracer carriage 22 has an arm 31 projecting rearwardly from its rear lower portion to cooperate with a cam 32 on the feed cam shaft, and a spring arm 33 projecting forwardly from the lower portion of the carriage and carrying a roller 34 bearing against a track 35 on top of the base serves by reaction to hold the carriage at all times firmly against this cam.

The engraving or cutting tool 36 is supported in a relatively stationary manner, that is to say stationary with respect to reciprocation of the other parts, over the work-holder 18. It is carried by a primary carriage 37 comprising spaced side arm members 38, united by a cross-piece 39. The forward lower ends of these side arm members 38 are journaled in bearings in the brackets 16 and in a bracket 40 concentrically with the shaft 14. From this pivotal support the carriage extends rearwardly and upwardly, and between its upper rear portions, at 41, is pivoted a forwardly extending tool arm 42, which carries the tool.

The tool arm is urged downward or toward the work, indicated at a in Fig. 5, by gravity and/or a spring 43 coiled about a post 44 rising from the cross-bar 39 through a suitable opening in the arm 42, the spring being confined between the arm and a collar 45 on the post, which collar can be shifted by means of a cam 46 to vary the pressure on the spring. A downwardly projecting tail 47 on the tool arm carries an armature 48 arranged to be attached by an electromagnet 49 mounted in the primary carriage 37 on a cross-bar 50. The circuit 51, which includes the coils of this magnet and the energizing battery 4, is adapted to be opened and closed at the contacts 28, 29, in response to the oscillatory movements of the tracer arm 25. This is represented in the diagram, Fig. 11, where one side of the circuit will be seen passing to ground by way of a binding post 52, contact 53, spring contact 54, and an arm 55 on a shaft 56, while the other side of the circuit passes from the battery by way of binding post 57 through the coils of the magnet and thence to the stationary contact 29, and thence, when the tracer is completely lowered, to the tracer arm 25 to ground. Consequently when the tracer is completely lowered or in its position nearest the plane of the pattern, the magnet is energized and the tool is thereby lifted and held away from the work. As soon as the tracer is moved upward from this position or away from the pattern, the magnet is de-energized and the tool moves downward into cutting engagement with the work.

The manner of mounting or shifting the stationary contact 29, which constitutes a stop determining the lowest position of the tracer, forms one of the novel features of the present machine. As seen most clearly in Fig. 10, the contact 29 is fixed in the horizontal arm of an angle bracket 58, the vertical limb of which lies within a vertical channel 59 in the front face of a top portion 60 of the tracer carriage, where it is applied to the face of a vertically movable slide 61. This slide is movable vertically by a fine-thread screw 62, the upper part of which is swiveled at 63 in an overhanging flange 64 on the tracer carriage, while its lower portion is in engagement with a screw-threaded hole in an angled upper portion 65 on the slide. The knurled head 66 on the upper end of the screw, at the top of the tracer carriage, permits of ready and precise adjustment. The bracket 58 is connected to the slide 61, and is also locked in any position to which these parts may be shifted by the screw 62, by means of a horizontal set-screw 67, the forward end of which is threaded into the vertical limb of the bracket 58, the screw passing through a hole in the slide 61 and through a comparatively wide vertical slot 68 in the tracer carriage. The head of this screw likewise binds the terminal 69 of the conductor leading to the fixed contact. The bracket 58 is insulated from the slide 61, and also from the sides of the channel 59 of the tracer carriage, by an interposed sheet of insulation 70 of channel form. The screw 67, which conducts the current from the terminal 69 to the bracket 58, is insulated from the slide 61 by a bushing 71, and from the tracer carriage by an insulating disk 72 beneath the terminal 69.

As in Bruckner & McKeown machine, the tracer and the tool are fed forwardly in a direction transverse to the longitudinal or relatively reciprocatory movement by feed members or cams 32 and 73 on the cam shaft 21, heretofore referred to. The cam 32, which coacts with the tracer carriage, has been previously mentioned. The cam 73 acts upon the pivoted primary tool carriage 38, and by the swinging movement of this carriage advances the pivoted tool arm 42.

In connection with these parts an improved means for centering the tool is provided. To this end one of the side arms 38 of the primary tool carriage 37 is formed with an external lug or portion 74 which projects directly over the cam 73, and a substantially vertical screw is mounted in a screw-threaded opening through this lug. The upper end of the screw, above the lug, is provided with a kerf so that it may be screwed up or down, and a lock-nut 75 holds it against shifting in any position. The lower end of the screw carries a convex foot 76 which bears upon the top of the cam. Consequently by setting this screw up or down, in a convenient manner, the position of the tool will be shifted forward or rearward, as the case may be.

Means are also provided for regulating the horizontal parallelism or slight angularity of the longitudinal reciprocatory travel of the tracer relative to the longitudinal movement of the slide 14, in order that the tracer may travel in true parallelism with the longitudinal center line of the pattern. This means comprises a separate shoe 31$^a$ on the under side of the extremity of the arm 31 of the tracer carriage, this shoe being sufficiently extended lengthwise of the machine to include the amplitude of reciprocation of the tracer carriage, and being provided with means whereby it can be slightly tilted lengthwise relatively to the arm of the carriage on which it is mounted. Such tilting of the shoe in approximately a vertical plane is translated, as the carriage reciprocates with the shoe in contact with the feed cam, into slight skewing or rectification in the horizontal plane of the lines of travel of the tracer. The construction may be somewhat varied, but a simple and satisfactory embodiment is one in which the shoe is secured to the extremity of the tracer-carriage arm by two longitudinally-spaced screws 31$^b$, between which is a fulcrum projection 31$^c$ on the arm, upon which the foot can be rocked by slightly unscrewing one of the screws and tightening the other.

The feed-cam shaft 21 has at one end a knurled wheel 77 by means of which the shaft can be turned manually to bring the tracer and the tool to the desired starting positions.

On the other end of this shaft is a ratchet wheel 78 adapted to be turned by fine gradations by a feed pawl 79, which is pivoted to an upward extension 80 on an arm 81, which in turn is pivoted to swing on the end of the shaft 21. A screw 82 passing downward through the pawl 79 so as to ride on a fixed frame surface enables the effective thrust of the pawl and the extent to which the shaft is turned at each operation to be regulated.

A holding pawl 83 prevents retrograde movement.

The forward end of the oscillatory arm 81 is formed as a convex foot 84 to ride on top of the cam 12, in order to be acted upon by a ramp or face cam 85 carried by this cam member. This ramp is properly positioned to raise the arm 81 and produce the slight feed movement of the tracer and tool at the proper times.

A link 86 is pivoted at its lower end to the arm 81 and at its upper end to a crank 87 on a longitudinal rock-shaft 88, which is journaled in portions of the brackets 15, 16, and extends under the tool arm 42 and behind the tracer carriage 22. This shaft forms an element of the mechanical lifting and supporting means for the tool and tracer, and through the connections described is operated by the ramp 85 at the proper times and held in actuated position by the ramp for a proper period of time; that is to say this rock-shaft is partially turned in the lifting direction at or slightly before the end of the working stroke of the machine and held in this position throughout the idle stroke, and is then caused to return to its original position so as to deposit the tracer again at or slightly after the beginning of the working stroke.

Two parts or branches are operated by the shaft 88 for supporting, respectively, the tracer and the tool, and these branches are set or coordinated for successive or overlapping operation upon the tool and tracer, as previously stated.

The tool-supporting branch includes a finger 89 lying beneath the tool arm 42 and projecting from a hub 90 encircling the shaft, this hub not being fixed to the shaft, so that the shaft is capable of turning inside it. The hub and the shaft are connected, however, by a yieldable transmission and storage element consisting of a spring 91 coiled about the shaft with its opposite ends engaged with the hub and with a collar 92 fixed to the shaft. A pin 93 projecting from the shaft retains the hub 90 against longitudinal movement, and also cooperates with a shoulder 94 on the hub to determine the normal position of the finger 89, the tension of the spring 91 tending to hold the shoulder against the pin.

The part or branch of the lifting and supporting mechanism to act upon the tracer includes a finger 95 fixed to the remote portion of the shaft 88. A further portion of this branch of mechanism consists of a two-armed lever 96 which is pivoted intermediate its end on a screw 97 on the tracer-carriage 22. The forward arm of this lever projects beneath the tracer-arm 25 and its rear arm passes beneath the finger 95, and a spring 98 urges the lever in the direction to lower its forward arm and raise its rear arm. As shown in Fig. 7, there is initial lost motion in this branch, between the shaft 88 and the tracer-arm, so that when the shaft is rocked in the clockwise direction in this view the tracer arm is not lifted immediately. The finger 89, however, is then ready to move upward to support the tool-arm 42, and does so before the tracer is lifted. The tracer lifting branch then comes into action and lifts the tracer, which breaks the circuit, which would cause the tool to fall were it not that the tool is already supported. During continued turning movement of the shaft to complete the lifting of the tracer, the shaft 88 turns within the hub 90 of the finger 89, the pin 93 moving somewhat away from the shoulder 94, as seen in Fig. 2.

The parts are held in this condition with both the tracer and tool mechanically supported while the end 84 of the arm 81 rides upon the flat top of the ramp 85. When the end of the said arm descends the incline at the rear end of the ramp, the rock-shaft 88 is turned in the reverse direction, or counter-clockwise. The immediate result of this is to lower the tracer and close the break in the electric circuit at the contacts 28, 29. While this is being accomplished, the shaft 88 is turned within the hub 90 of the finger 89, the finger continuing to be held in tool-supporting relation by the power stored in the spring 91. After the tracer has been completely lowered and the circuit has therefore been closed so as to energize the lifting magnet 49, the finger 89 is finally moved downward away from the tool arm.

A starting device for the machine includes the transverse rock-shaft 56 journaled in brackets 96, 97 on the base, and having a finger push 98 at its forward end. A nose 99 also on the forward end of this shaft is adapted to rest upon the top of a finger 100 projecting upward from a pivoted trigger 101 having a finger-push 102. A spring 103 acts upon the trigger in the direction to hold it in supporting relation to the nose 99. At the end of the forward feed movement of the tracer and tool, the point of a screw 104 on a forward lower extension 105 of one of the arms 38 of the primary tool carriage depresses the trigger 101 sufficiently to withdraw its finger 100 from beneath the nose 99 on the starting shaft 56, whereupon this shaft is turned by the upward pressure of the spring contact 54. This breaks the electric circuit at this point, as the contact 54 moves away from the contact 53 (Fig. 4).

In this movement of the starting shaft 56 the mechanical lifting and supporting means for the tracer and tool is also operated. In the present improved machine this is accomplished in an advantageous manner by providing the starting shaft 56 with an abutment 106 which underlies a portion 107 of the arm 81 heretofore referred to. Consequently when the machine stops, the abutment 106 acts to raise the arm 81, which through the link 86 before described lifts both the tracer and the tool, and breaks the other side of the electric circuit at the contacts 27, 28.

The arm 55 at the rear end of the starting shaft, which is acted upon by the contact spring 54, also controls the spring motor of the machine. A push-rod 108 extends downward through the top of the base of the machine, its upper end being beneath the arm 55, and its lower end being positioned to move the friction brake element 8 of the speed governor away from the disk, against the action of the spring 10. The arm 55 acts upon the upper end of said rod through an exposed adjustable screw 109, threaded through the arm. By a convenient adjustment of this screw, therefore, the machine can be adjusted to run at the best engraving speed.

The feed shaft 21 is turned by hand to set the tracer and tool at the desired starting points, and an indicator is provided to apprise the operator of a plurality of starting points, suitable for different widths of engraving or different classes of work. For this purpose the face of the rachet wheel 78 is provided with two or more definitely located, angularly spaced, curved bottom recesses 110, 111, to cooperate with the rounded end of a detent plunger 112. This plunger is mounted slidably in a bracket 113 fixed to the starting shaft 56, and is pressed toward the wheel by a spring 114. When the shaft 56 is in the stop position the detent presses against the face of the wheel in readiness to drop into the recesses when they are brought beneath it through the manual turning of the feed-cam shaft 21 by the knob 77. When the detent snaps into the first recess the operator is aware that he has brought the parts to one starting position. If the next position is desired, he continues to turn the knob, thereby camming the detent out of the first recess, and causing it to ride upon the face of the wheel until it can drop into the next recess. When the starting device is operated to start the machine, the bracket 113 and the plunger 112 are moved away from the ratchet wheel so that the plunger does not bear upon the wheel during the working of the machine.

While the matters forming the novelty of the invention have been described in detail in order that they may be properly understood, I do not wish to limit myself to the precise form, particularly of the lifting and supporting mechanism, which may obviously be varied in arrangement without departing from the novel principle involved.

What I claim as new is:

1. In an engraving machine of the kind described having a relatively reciprocatory tracer and pattern-holder, a relatively reciprocatory tool and work-holder, and electrical means controlled by the oscillation of the tracer to govern the operation of the tool, mechanical means for automatically supporting the tracer and tool out of action during relative reciprocation in one direction, said means comprising two parts which coact with the tracer and tool respectively in a successive manner so as to support the tool before lifting the tracer and thereby breaking the circuit of said electrical means, and thereafter to lower the tracer and close the circuit before removing support from the tool so that it descends upon the work.

2. In an engraving machine of the kind described having a relatively reciprocatory tracer and pattern-holder, a relatively reciprocatory tool and work-holder, and electrical means controlled by the oscillation of the tracer to govern the operation of the tool, mechanical means for automatically supporting the tracer and tool out of action during relative reciprocation in one direction, said means comprising a rock-shaft and means for operating the same in synchronism with the reciprocatory strokes of the machine, and two fingers on the shaft adapted to coact in a successive manner with the tracer and tool, there being a yielding spring which connects the tool-supporting finger with the rock-shaft.

3. In an engraving machine of the kind described having a relatively reciprocatory tracer and pattern-holder, a relatively reciprocatory tool and work-holder, and electrical means controlled by the oscillation of the tracer to govern the operation of the tool, mechanical means for automatically supporting the tracer and tool out of action during relative reciprocation in one direction, said means having two parts so set that one acts to support the tool before the other lifts the tracer and thereafter lowers the tracer before the other removes support from the tool, there being common means for actuating said parts from the driving mechanism of the machine, with a yielding spring connection peculiar to the tool supporting part.

4. In a machine of the kind described, the combination with the rock-shaft and means for periodically operating the same and a tracer-lifter operated by said shaft, of a tool-supporting finger mounted on said shaft in such manner that the shaft though operating the finger is capable of turning relatively thereto, and a coil spring about the shaft connected at its opposite ends with the shaft and the finger respectively, in order that the tool-supporting finger may be moved to support the tool before the tracer is lifted and on the reverse rocking movement will continue to support the tool through the spring until the tracer is completely lowered.

5. In an engraving or reproducing machine of the kind wherein a doubly-movable tracer carriage is reciprocated relatively to a pattern and is intermittently fed by a cam or feed member transversely to the reciprocation, a separate shoe on such reciprocatory tracer carriage bearing slidingly on the feed member, and means for tiltingly adjusting said shoe on the carriage to regulate the direction of reciprocation of the tracer parallel with the pattern.

6. In an engraving or reproducing machine of the kind wherein a tracer is reciprocated over a pattern and is intermittently fed transversely to the reciprocation, a tracer carriage carrying a tracer in its upper portion and pivoted at its lower portion for the feed movement of the tracer, means for reciprocating the tracer carriage, said reciprocatory tracer carriage having a rearwardly extended arm, and a relatively stationary cam shaft and feed cam below said arm, in combination with a separate shoe on the tracer carriage bearing slidingly on the feed cam, and means for adjusting said shoe on the arm in a longitudinal up and down tiltable manner so as to regulate the direction of reciprocation of the tracer in the horizontal plane.

7. In an engraving machine of the kind wherein a tool is moved up and down into and out of cutting engagement with the work which is reciprocated, and is intermittently fed transversely to the reciprocation, said machine having a work-holder, a tool carriage having a tool arm pivoted to its upper rear portion for up and down movement of the tool supported on the forward part of said arm over the work, said tool carriage being itself pivoted at its lower portion for the feed movement of the tool, an electromagnet in the carriage for actuating the tool arm and a cam shaft and feed cam below the tool carriage, the provision of a portion on one side of the carriage having an opening directly over said cam, and a screw movable up and down and adapted to be set in said opening and having a foot which bears upon the cam.

8. In an engraving machine of the kind having a relatively reciprocatory tracer and pattern-holder, a relatively reciprocatory tool and work-holder, a feed shaft for producing relatively feed between the parts transverse to the reciprocation, and means whereby the oscillation of the tracer as it moves the pattern is applied through electrical means to control the operation of the tool, the combination with a tracer arm carrying the movable member of a pair of electric contacts, a rock-shaft and lifter adapted to lift the tracer arm, an oscillatory arm operating means to turn said feed shaft step by step, a driving motor, means driven thereby for actuating said oscillatory arm at intervals, a connection between said oscillatory arm and said rock-shaft, a manual starting member for starting the driving motor, a trigger for holding said starting member against the action of a spring, and an abutment on said starting device positioned to bear against a part of said oscillatory arm and through said arm to actuate the tracer lifter when the machine is stopped.

PETER ANTHONY BROCK.